United States Patent
Lee et al.

(10) Patent No.: US 11,468,663 B2
(45) Date of Patent: *Oct. 11, 2022

(54) METHOD FOR GENERATING A CUSTOMIZED/PERSONALIZED HEAD RELATED TRANSFER FUNCTION

(71) Applicant: Creative Technology Ltd, Singapore (SG)

(72) Inventors: Teck Chee Lee, Singapore (SG); Christopher Tjiongan, Singapore (SG); Desmond Hii, Singapore (SG); Geith Mark Benjamin Leslie, London (GB)

(73) Assignee: Creative Technology Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,676

(22) Filed: Apr. 20, 2020

(65) Prior Publication Data

US 2020/0250466 A1    Aug. 6, 2020

Related U.S. Application Data

(63) Continuation of application No. 16/062,521, filed as application No. PCT/SG2016/050621 on Dec. 28, 2016, now abandoned.

(30) Foreign Application Priority Data

Dec. 31, 2015  (SG) ........................... 10201510822Y

(51) Int. Cl.
*G06V 10/75*    (2022.01)
*G06V 40/10*    (2022.01)
(Continued)

(52) U.S. Cl.
CPC .............. *G06V 10/752* (2022.01); *G06T 3/40* (2013.01); *G06T 7/0002* (2013.01); *G06T 7/149* (2017.01);
(Continued)

(58) Field of Classification Search
None
See application file for complete search history.

(56) References Cited

U.S. PATENT DOCUMENTS 6,996,244 B1 *  2/2006  Slaney .................... H04S 1/002
                                                        381/303
7,555,354 B2    6/2009  Walsh et al.
(Continued)

FOREIGN PATENT DOCUMENTS

CN      101847268 A    9/2010
FR      3051951 B1    6/2018
(Continued)

OTHER PUBLICATIONS

Meshram et al., "P-HRTF: Efficient Personalized HRTF Computation for High-Fidelity Spatial Sound," 2014 IEEE International Symposium on Mixed and Augmented Reality (ISMAR), 2014, pp. 53-61, Munich, Germany.
(Continued)

*Primary Examiner* — Leon Viet Q Nguyen
(74) *Attorney, Agent, or Firm* — Russell Swerdon; Desmund Gean

(57) ABSTRACT

There is provided a method for generating a personalized Head Related Transfer Function (HRTF). The method can include capturing an image of an ear using a portable device, auto-scaling the captured image to determine physical geometries of the ear and obtaining a personalized HRTF based on the determined physical geometries of the ear.

17 Claims, 4 Drawing Sheets

(51) Int. Cl.
  *G06T 7/149* (2017.01)
  *G06T 3/40* (2006.01)
  *G06T 7/00* (2017.01)
  *H04S 7/00* (2006.01)

(52) U.S. Cl.
  CPC .......... *G06V 10/7553* (2022.01); *G06V 40/10* (2022.01); *H04S 7/302* (2013.01); *G06T 2207/20124* (2013.01); *G06T 2207/30196* (2013.01); *H04S 2420/01* (2013.01)

(56) References Cited

U.S. PATENT DOCUMENTS

| | | | |
|---|---|---|---|
| 7,840,019 | B2 | 11/2010 | Slaney et al. |
| 7,936,887 | B2 | 5/2011 | Smyth |
| 9,030,545 | B2 | 5/2015 | Pedersen |
| 9,544,706 | B1 * | 1/2017 | Hirst .............. H04S 7/302 |
| 9,602,947 | B2 | 3/2017 | Oh et al. |
| 10,225,682 | B1 | 3/2019 | Lee et al. |
| 10,390,171 | B2 | 8/2019 | Lee et al. |
| 10,805,757 | B2 * | 10/2020 | Lee .................. H04R 3/00 |
| 2007/0270988 | A1 | 11/2007 | Goldstein et al. |
| 2008/0170703 | A1 | 7/2008 | Zivney |
| 2012/0008806 | A1 | 1/2012 | Hess |
| 2012/0183161 | A1 | 7/2012 | Agevik et al. |
| 2013/0169779 | A1 * | 7/2013 | Pedersen ............ G06K 9/00362 348/77 |
| 2015/0073262 | A1 * | 3/2015 | Roth .................... A61B 5/055 600/411 |
| 2015/0124975 | A1 | 5/2015 | Pontoppidan |
| 2015/0312694 | A1 | 10/2015 | Bilinski et al. |
| 2015/0373477 | A1 | 12/2015 | Norris et al. |
| 2015/0382127 | A1 | 12/2015 | Sun et al. |
| 2016/0379041 | A1 * | 12/2016 | Rhee ................... G06K 9/6296 382/118 |
| 2017/0272890 | A1 * | 9/2017 | Oh ......................... H04S 7/304 |
| 2018/0091920 | A1 | 3/2018 | Family |
| 2018/0218507 | A1 * | 8/2018 | Hyllus .................. G06T 7/344 |
| 2018/0249279 | A1 | 8/2018 | Karapetyan et al. |
| 2020/0137508 | A1 | 4/2020 | Lee et al. |

FOREIGN PATENT DOCUMENTS

| | | |
|---|---|---|
| WO | 2017041922 A1 | 3/2017 |
| WO | 2017/202634 A1 | 11/2017 |

OTHER PUBLICATIONS

Dalena, Marco. "Selection of Head-Related Transfer Function through Ear Contour Matching for Personalized Binaural Rendering," Politecnico Di Milano Master thesis for Master of Science in Computer Engineering, 2013, Milano, Italy.

Cootes et al., "Active Shape Models—Their Training and Application," Computer Vision And Image Understanding, Jan. 1995, pp. 38-59, vol. 61, No. 1, Manchester, England.

John C. Middlebrooks, "Virtual localization improved by scaling nonindividualized external-ear transfer functions in frequency," Journal of the Acoustical Society of America, Sep. 1999, pp. 1493-1510, vol. 106, No. 3, Pt. 1, USA.

Yukio Iwaya, "Individualization of head-related transfer functions with tournament-style listening test: Listening with other's ears," Acoustical Science and Technology, 2006, vol. 27, Issue 6, Japan.

Slim Ghorbal, Theo Auclair, Catherine Soladie, & Renaud Seguier, "Pinna Morphological Parameters Influencing HRTF Sets," Proceedings of the 20th International Conference on Digital Audio Effects (DAFx-17), Sep. 5-9, 2017, Edinburgh, UK.

Slim Ghorbal, Renaud Seguier, & Xavier Bonjour, "Process of HRTF individualization by 3D statistical ear model," Audio Engineering Society's 141st Convention e-Brief 283, Sep. 29, 2016-Oct. 2, 2016, Los Angeles, CA.

Robert P. Tame, Daniele Barchiesi, & Anssi Klapuri, "Headphone Virtualisation: Improved Localisation and Externalisation of Non-individualised HRTFs by Cluster Analysis," Audio Engineering Society's 133rd Convention Paper, Oct. 26-29, 2012, San Francisco, CA.

Karapetyan et al., Elevation Control in Binaural Rendering, Jun. 4-7, 2016, pp. 1-4, Audio Engineering Society, 140th Convention e-Brief 270, Paris, France.

Zotkin, Dmitry et al., HRTF Personalization Using Anthropometric Measurements, 2003 IEEE Workshop on Applications of Signal Processing to Audio and Acouistics, Oct. 19-22, 2003, p. 157-160, New Paltz, NY.

* cited by examiner

METHOD FOR GENERATING A CUSTOMIZED/PERSONALIZED HEAD RELATED TRANSFER FUNCTION

CROSS-REFERENCE TO RELATED APPLICATIONS

This application is a continuation of U.S. patent application Ser. No. 16/062,521, which is the National Stage (§ 371) of International Application No. PCT/SG2016/050621, filed 28 Dec. 2016 and entitled "METHOD FOR GENERATING A CUSTOMIZED/PERSONALIZED HEAD RELATED TRANSFER FUNCTION", which claims the benefit of priority from Singapore Patent Application No. 10201510822Y, filed 31 Dec. 2015 and entitled "A METHOD FOR GENERATING A CUSTOMIZED/PERSONALIZED HEAD RELATED TRANSFER FUNCTION", the entirety of which are incorporated by reference for all purposes.

FIELD OF INVENTION

The present disclosure generally relates a method for generating a customized/personalized Head Related Transfer Function (HRTF) based on a captured image.

BACKGROUND

Accurate interactive 3D spatial audio rendering requires personalized head-related transfer functions (HRTFs).

Traditionally to obtain such personalized HRTFs, a user is required to sit, without moving, for about half an hour in an anechoic chamber with audio signals being emitted from different locations within the chamber. A microphone is placed in the user's ear for capturing audio signals as audibly perceived by the user. There is also need to consider factors such as chamber, audio signal source(s) and microphone responses. Such responses may be considered spurious responses and there may be a need to eliminate such spurious responses in order to obtain a Head Related Impulse Response (HRIR) which can subsequently be converted to a HRTF.

Prior art techniques have emerged to simplify the above approach. Specifically, it is desired to eliminate the need for an anechoic chamber and address issues such as the aforementioned spurious responses.

One such prior art technique is "P-HRTF: Efficient Personalized HRTF Computation for High-Fidelity Spatial Sound, Meshram et al. Proc. of IMAR 2014 (http://gamma.cs.unc.edu/HRTF/)". This prior art technique reconstructs a detailed ear model from multiple photos and perform acoustic simulation to get HRTF. A densely captured set of photos (20+ photos at recommended 15 degrees interval, using SLR Canon60D 8MP) and significant computing power would be required.

Another such prior art technique is "Selection of Head-Related Transfer Function through Ear Contour Matching for Personalized Binaural Rendering. POLITECNICO DI MILANO. Master of Science in Computer Engineering. Dalena Marco. Academic Year 2012/2013". This prior art technique contemplates that instead of physically modeling the ear and the acoustics, it may be possible to perform image based matching using an existing database. The existing database can include a collection of images (e.g., photos) associated with corresponding HRTF(s). Given an image, generalized Hough transform can be used to find the best match (relative to the collection of images in the existing database) for the given image so as to obtain a corresponding HRTF.

However, it is appreciable that the above discussed approaches/techniques would require much resource in terms of computing power. Moreover, the above discussed approaches/techniques may not facilitate the creation of personalized HRTF(s) is a user friendly and/or efficient manner.

It is therefore desirable to provide a solution to address the foregoing problems.

SUMMARY OF THE INVENTION

In accordance with an aspect of the disclosure, there is provided a method for enhancing audio rendering by generating a customized HRTF. The method includes: (1) acquiring a captured image of at least one ear of an individual using an image capturing device configured for processing a preliminary image that is a preliminary version of the captured image, the acquiring the captured image including applying a shape model to the preliminary image and the captured image of at least one ear of the individual to obtain a shape model conformed to the preliminary image and the captured image of at least one ear of the individual, the shape model being conformable to an object by being deformed based on control points; (2) extracting image based properties of the at least one ear of the individual from the control points of the shape model conformed to the captured image of at least one ear of the individual; and (3) providing the image based properties of the at least one ear of the individual to a selection processor configured to select based on image based properties of an ear a customized HRTF dataset from a plurality of HRTF datasets that have been determined for a plurality of individuals.

In accordance with another aspect of the disclosure, there is provided a processing device for processing customized HRTFs. The processing device includes an image processing device configured for: (1) acquiring a captured image of at least one ear of an individual and processing at least one preliminary image that is a preliminary version of the captured image; (2) applying a shape model to the preliminary image and the captured image of at least one ear of the individual to obtain a shape model conformed to the preliminary image and the captured image of at least one ear of the individual, the shape model being conformable to an object by being deformed based on control points; (3) extracting image based properties of the at least one ear of the individual from the control points of the shape model conformed to the captured image of at least one ear of the individual; and (4) providing the extracted image based properties of the at least one ear of the individual to a selection processor configured to select based on image based properties of an ear a customized HRTF dataset from a plurality of HRTF datasets that have been determined for a plurality of individuals.

In accordance with yet another aspect of the disclosure, there is provided a system for generating customized HRTFs. The system includes: (1) an image processing device configured for acquiring a captured image of at least one ear of an individual and for processing a preliminary image that is a preliminary version of the captured image; (2) a device processor configured for: applying a shape model to the preliminary image and the captured image of at least one ear of the individual to obtain a shape model conformed to the preliminary image and the captured image of at least one ear of the individual, the shape model being conformable to an object by being deformed based on control points; and extracting image based properties of the at least one ear of the individual from the control points of the shape model conformed to the captured image of at least one ear of the individual; (3) a selection processor for receiving the extracted image based properties of the at least one ear of the individual and configured to select based on image based properties of an ear a customized HRTF dataset from a plurality of HRTF datasets that have been determined for a plurality of individuals wherein the device processor and the selection processor can be separate units or combined into one processor; and (4) a memory accessible by the selection processor and including the plurality of HRTF datasets, wherein the plurality of HRTF datasets is indexed by image based properties corresponding to an ear represented by each HRTF dataset in the plurality of HRTF datasets.

BRIEF DESCRIPTION OF THE DRAWINGS

Embodiments of the disclosure are described hereinafter with reference to the following drawings, in which.

DETAILED DESCRIPTION

The present disclosure relates to a method 100 (as will be shown in further detail with reference to FIG. 1) for creating/generating a personalized/customized Head Related Transfer Function (HRTF) from an image captured using a portable device such as a Smartphone having a camera. The present disclosure contemplates that the prior art technique concerning Hough transform is the simplest as compared the prior art technique which relates to the reconstruction of a detailed ear model from multiple photos and the traditional approach involving the use of an anechoic chamber. The present disclosure further contemplates the need to further simplify the prior art technique concerning Hough transform so as to at least facilitate the creating/generating personalized HRTF(s) in a user friendly and/or efficient manner.

Figure 1:
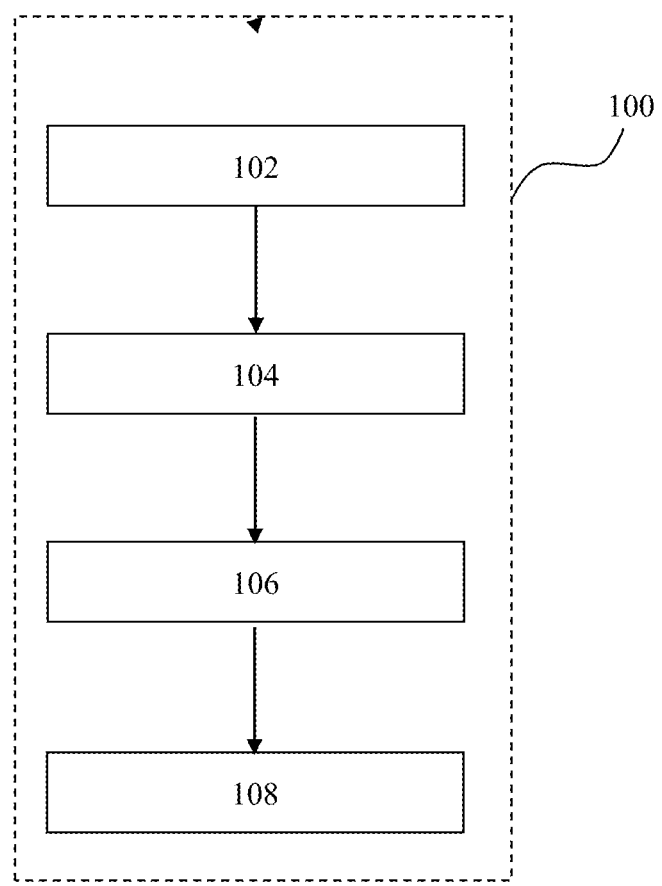
FIG. 1 shows a method for creating/generating a personalized/customized Head Related Transfer Function (HRTF) from an image captured using a portable device such as a Smartphone having an a camera, according to an embodiment of the disclosure.

Referring to FIG. 1 a method 100 for creating/generating a personalized/customized HRTF is shown in accordance with an embodiment of the disclosure. Specifically, a personalized/customized HRTF can be created/generated from an image captured using a portable device.

The method 100 can include an image capturing step 102, a reference determination step 104, an analyzing step 106 and a personalizing step 108.

At the image capturing step 102, at least one image of an ear can be captured using a portable device having an image capturing device. For example, the portable device can correspond to a Smartphone having a camera.

At the reference determination step 104, a scale factor in relation to the captured image can be determined. Preferably, the scale factor is determined without having to rely on manual measurement. The scale factor can be used as a basis for auto-scaling as will be discussed later in further detail.

In one embodiment, the scale factor can be determined based on eye separation (i.e., Interpupillary Distance). In another embodiment, the scale factor can be determined based on average tragus length. In yet another embodiment, the scale factor can be determined based on focus point of the image capturing device. In yet a further embodiment, the scale factor can be determined based on a reference object (e.g., a business card or a can) and/or a depth camera with a known focal length.

In regard to determination of scale factor based on eye separation, a user can capture two images. One image can be a photograph the user took of himself/herself (e.g. a selfie taken with the portable device at approximately half an arm's length away) where the eyes of the user can be detected. Another image can be a photograph of one ear of the user taken, for example, by having the user rotate his/her head after the first image is captured. Specifically, after the user has taken a selfie (i.e., the first image) of himself/herself where the eyes of the user can be detected, the user can rotate his/her head to capture an image of his/her ear (i.e., the second image which can correspond to the aforementioned image of an ear captured at the image capturing step 102) with the portable device is held in place for both images (i.e., position of the portable device when the selfie was taken is retained for capturing the second image). Alternatively, it is also possible to sweep the portable device in an arc (i.e., from the eyes to the ear or from the ear to the eyes), while keeping the distance between the portable device and the user's head substantially constant during the sweep, to capture both images of the eyes and the ear. For example, the portable device can be held, by a user, at arm's length while taking a selfie (i.e., the first image) of himself/herself where the eyes of the user can be detected and after the selfie is taken, the user can sweep, while keeping the portable device at the same arm's length (per when the first image was captured), to the side of his/her head to capture an image of his/her ear (i.e., the second image). It is contemplated that physical eye separation is typically approximately 6.5 cm for adults (appreciably, eye separation for children can differ). Therefore, a scale factor can be derived. For example, for the first image, the separation, image wise, between two eyes can be 50 pixels. Hence, 50 pixels, image wise, can correspond to 6.5 cm in physical separation (i.e., 50 pixels can, for example, correspond to 6.5 cm in terms of physical dimension/measurement). Using an image dimension to physical dimension ratio of 50 pixels:6.5 cm (i.e., based on the first image), it can be possible to translate the image of the ear (i.e., the second image) to physical dimensions.

In regard to determination of scale factor based on average tragus length, it is contemplated that the tragus length is relatively consistent across different ears. Therefore, the tragus length can be used as a reference in analogous manner per earlier discussion in relation to eye separation (i.e., translation of the image of an ear to physical dimensions based on known/standard tragus length).

In regard to determination of scale factor based on focus point of the image capturing device, it is contemplated that the image capturing device (e.g., a camera) can have an autofocus feature. Accordingly, the image capturing device can autofocus on the user's ear when the user uses the image capturing device to capture an image of his/her ear. The autofocus is based on distance of lens to object (i.e., user's ear). The present disclosure contemplates that knowing the distance of the lens to the ear and the focal length (i.e., Lens's Field Of View) is sufficient to determine the scale factor.

At the analyzing step 106, ear features and geometrical properties, based on the image of the ear, can be detected using an Active Shape Model (ASM). ASM (developed by Tim Cootes and Chris Taylor in 1995) is commonly known to correspond to a distribution model of the shape of an object (e.g., shape of a ear) which iteratively deforms to fit to an example of the object in a new image (e.g., captured image of a user's ear) and the shape is constrained by a point distribution model (PDM). In this regard, image based geometrical properties (e.g., in terms of pixels) such as length of Concha, length of Tragus, width and/or height of the ear can be extracted/determined from control points which can be deformed in accordance with the PDM. Accordingly, the control points can conform to the shape of the ear based on the image captured (i.e., image of the ear) at the image capturing step 102. The control points will be discussed later in further detail with reference to FIG. 2.

At the personalizing step 108, a personalized HRTF can be derived/determined based on image based geometrical properties (e.g., in terms of pixels) of the user's ear as determined at the analyzing step 106 and the scaling factor as determined at the reference determination step 104. This will be discussed later in further detail with reference to an exemplary scenario).

The present disclosure contemplates that the physical dimensions of a user's ear can be derived based on image based geometrical properties (e.g., in terms of pixels) and the scaling factor. Such physical dimensions can be basis for deriving/determining a personalized HRTF.

Moreover, the present disclosure contemplates that physical geometries of the user's ear can be determined at either the analyzing step 106 or the personalizing step 108.

Figure 2A:
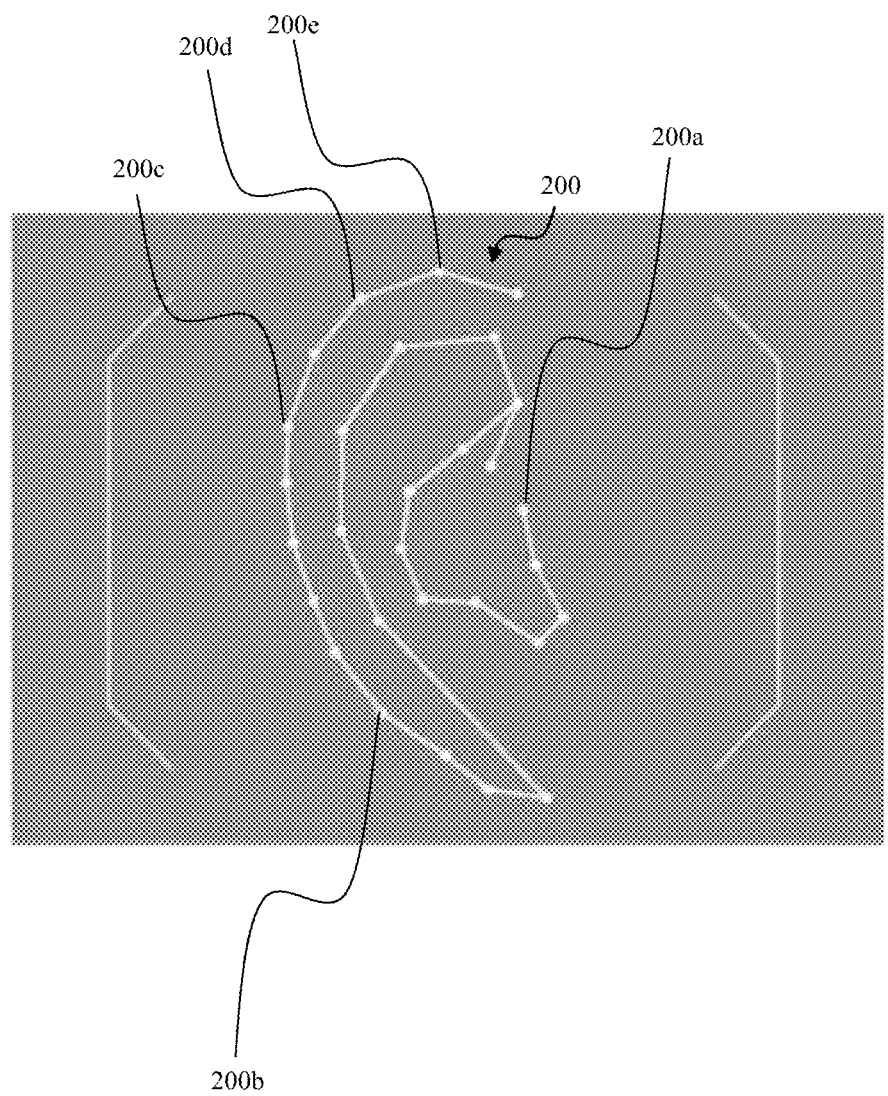
FIG. 2a shows an Active Shape Model having a plurality of control points which can be trained using a plurality of samples, according to an embodiment of the disclosure.

FIG. 2a shows an Active Shape Model 200 having a plurality of control points discussed earlier with reference to FIG. 1. For example, the Active Shape Model 200 can include a first control point 200a, a second control point 200b, a third control point 200c, a fourth control point 200d and a fifth control point 200e. As shown, the Active Shape Model 200 can correspond to the shape of an ear. Specifically, the plurality of control points can be arranged to correspond to the shape of an ear. The Active Shape Model 200 can be derived based on training using a plurality of samples. The samples can correspond to a plurality of ear images (i.e., more than one image of an ear). Preferably, the samples are obtained from different subjects (i.e., from different people). For example, the Active Shape Model 200 can be trained from 20 different subjects (i.e., 20 different ears). In an exemplary scenario, the Active Shape Model 200 can be derived by positioning the control points, in a consistent manner, in each of the samples.

Figure 2B:
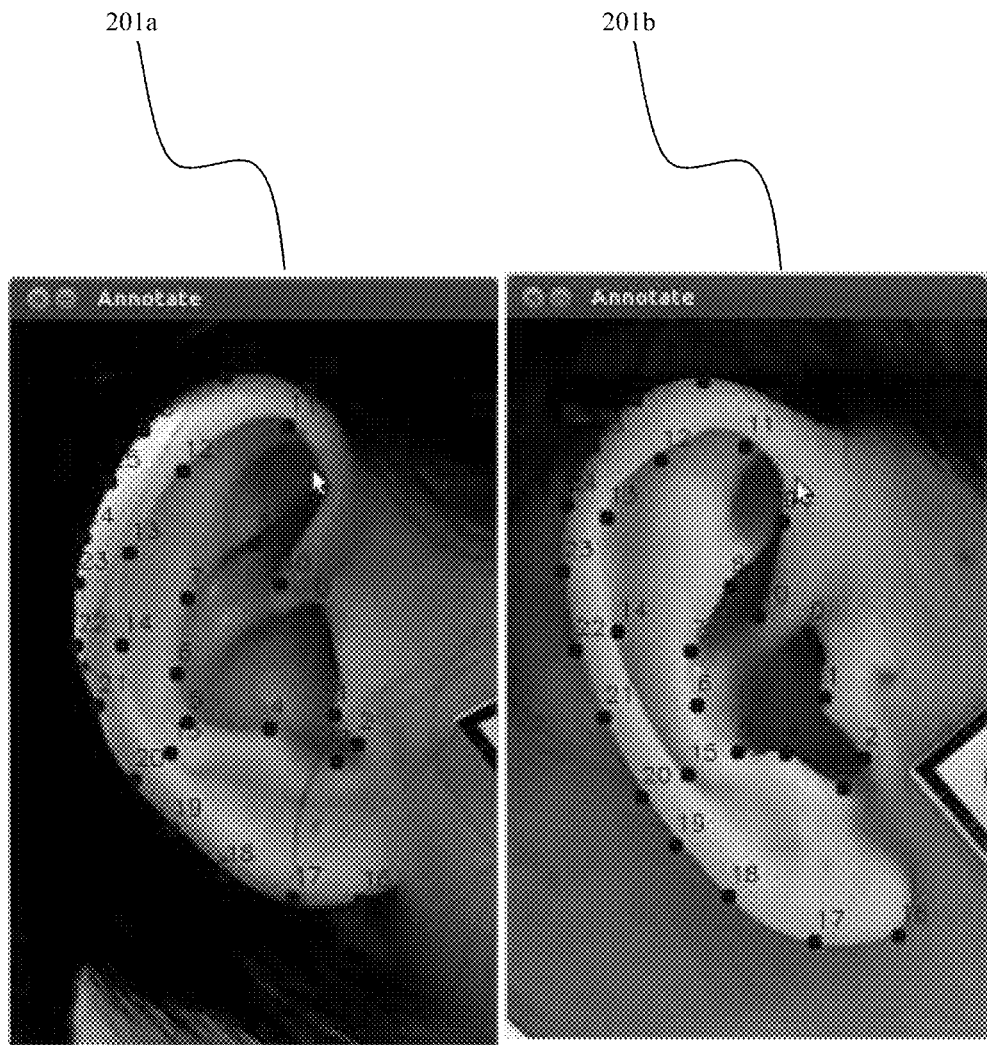
FIG. 2b shows that the plurality of samples of FIG. 2a can include a first sample and a second sample, according to an embodiment of the disclosure.

Specifically, referring to FIG. 2b, the plurality of samples as mentioned in FIG. 2a can include a first sample 201a and a second sample 201b. Each of the control points can consistently be positioned at respective different locations of an ear. For example, one of the control points (e.g., label 16) can be consistently positioned at one location (e.g., the earlobe) of an ear shown in each of the samples 201a/201b. Appreciably, by doing so for each control point, an average, based on the same control point (e.g., label 16) being positioned at substantially identical location (e.g., earlobe) of an ear across the samples, can be obtained. Therefore, from the training using a plurality of samples, an average shape of an ear can be derived. In this regard, the Active Shape Model 200 can be akin to a generic template which represents an average ear (i.e., based on training using the plurality of samples) and its underlying PDM. Such a generic template can be a base for iterative deformation for a new image (i.e., a new image of an ear as captured at the image capturing step 102). Additionally, the underlying PDM is, at the same time, derived when training the Active Shape Model 200. Specifically, limits of iterative deformation of the distribution of the control points (i.e., deviation of position of the control points per the Active Shape Model 200) based on a new image (i.e., a new image of an ear as captured during the image capturing step 102), as will be discussed in further detail with reference to FIG. 2c, can be constrained by the PDM as trained using the plurality of samples.

In accordance with an embodiment of the disclosure, the portable device can include a screen (not shown) and the control points of the Active Shape Model 200 can be presented via a graphics user interface (GUI) displayed on the screen. As shown, the Active Shape Model 200 can include a plurality of control points 200a/200b/200c/200d/200e.

Figure 2C:
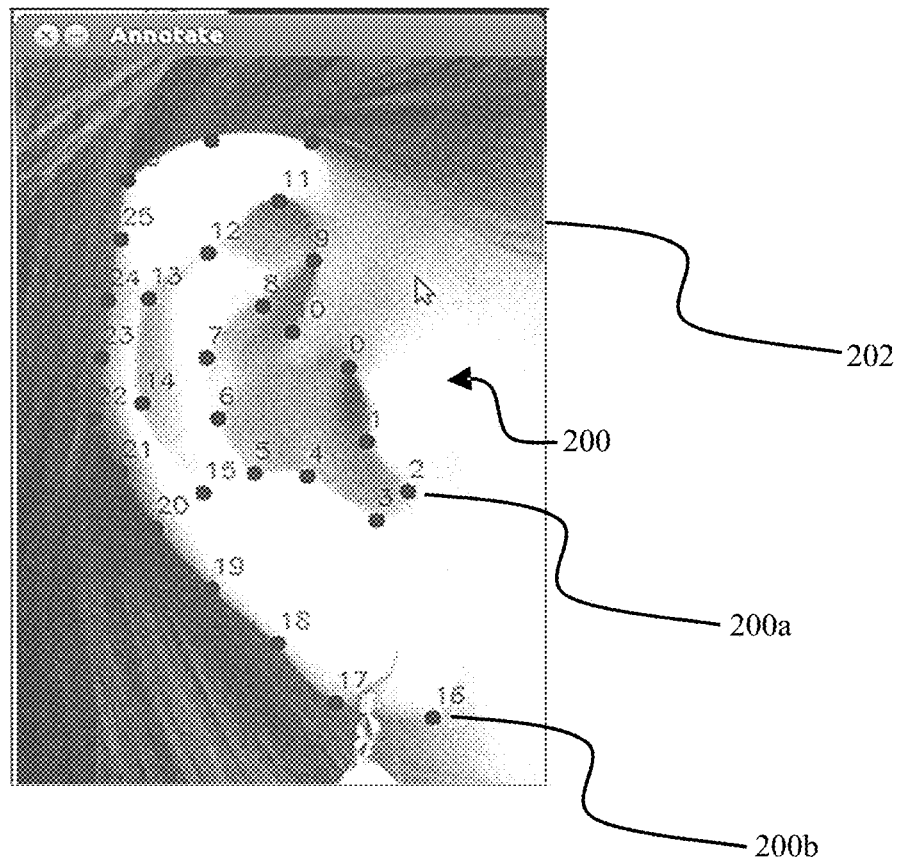
FIG. 2c shows the control points of FIG. 2a being conformed to the shape of a user's ear, according to an embodiment of the disclosure.

FIG. 2c shows the Active Shape Model 200 of FIG. 2a conformed to the shape of a user's ear (i.e., the aforementioned image of an ear as captured during the image capturing step 102) in accordance with an embodiment of the disclosure.

The control points can correspond to the aforementioned new image earlier discussed in FIG. 2a. In one exemplary application, the Active Shape Model 200 derived (i.e., based on training using a plurality of samples as discussed earlier) can be displayed on the screen of a portable device and as a user using the portable device positions the portable device so as to capture an image of his/her ear (i.e., new image), at least a portion of the screen can display a real-time image 202 of the user's ear. Appreciably, the real-time image 202 can change according to how the user positions the portable device. As such, the Active Shape Model 200 can iteratively deform accordingly. That is, the control points (e.g., the first to fifth control points 200a/200b/200c/200d/200e) can iteratively change to match the image of the user's ear as displayed on the screen. As such, the control points can, for example, to be visually perceivable to deviate in position so that the control points substantially overlay the image of the user's ear. Specifically, as shown in FIG. 2b, the Active Shape Model 200 should substantially overlay the image of the user's ear. More specifically, the control points of the Active Shape Model 200 as shown in FIG. 2a can conform to the shape of the user's ear. Therefore, the positions of the control points 200a/200b/200c/200d/200e of the Active Shape Model 200 can be iteratively changed in a manner so as to outline the shape of the user's ear (i.e., as shown by the real-time image 202 of the user's ear).

Preferably, an indication of stability (e.g., in the form of an audio feedback such as a "beep") can be provided to indicate whether an image currently displayed on the screen is suitable for capture. For example, an indication of stability can be provided when the control points of the Active Shape Model 200 cease to change in position (i.e., stop moving). That is, the Active Shape Model 200 can be considered to be substantially conformed to the shape of the user's ear (i.e., per real-time image 202 of the user's ear). Appreciably, in this manner, some form of "goodness" measure can be provided. Additionally, in this manner, it is also possible to perform a real-time detection of the user's ear as the user positions the portable device in preparation for image capture at the image capturing step 102.

Moreover, the present disclosure contemplates that it is desirable to improve ear detection performance so as to avoid any "spurious" image captures in which an image which looks like the user's ear (i.e., which is not actually an image of the user's ear) is captured.

Therefore, in accordance with an embodiment of the disclosure, further feedback signals (i.e., in addition to the aforementioned indication of stability) can be provided to indicate whether the portable device has been positioned appropriately. In one example, feedback signals from motion sensors such as a gyroscope/accelerometer and/or magneto sensors carried by the portable device can be provided to indicate whether the portable device is positioned appropriately.

Alternatively, focus distance associated with the image capturing device carried by the portable device can be used as a parameter in connection with improving ear detection performance. Specifically, focus distance associated with the image capturing device carried by the portable device can be used to determine the distance of an object of interest to the capturing device. The present disclosure contemplates that, In practice, the distance between the ear (i.e., an object of interest) and the capturing can be quite close (e.g. about 10 cm apart), so there is need only to consider the presence of an ear in the captured image(s) (e.g., camera video stream) when the focus distance is around 10 cm (e.g. only focus distance from 2 to 20 cm needs to be considered). Therefore, when the focus of the image capturing device is, for example, 1.2 meter in one instance, it can be safely assumed the object of interest in camera video stream as captured by the image capturing device in that instance does not correspond to an appropriate ear image.

The foregoing will be put in context based on an exemplary scenario in accordance with an embodiment of the disclosure hereinafter.

In one exemplary scenario, a portable device such as a Smartphone with a camera which can be used to a user to capture an image of his/her ear and a screen which is capable of displaying a GUI presenting an ASM related to an ear. The user can use the portable device to capture a selfie per earlier discussion so as to obtain a scaling factor. The scaling factor can be used as a basis for auto-scaling the captured image of an ear.

In accordance with an embodiment of the disclosure, the portable device can include software capable of presenting the GUI on the screen and conforming control points of the Active Shape Model 200 to the image of the user's ear to be captured. Specifically, the portable device can include a processor which can be configured to deform the Active Shape Model 200 so that the control points conform to the shape of the user's ear per the image of the user's ear to be captured. Upon receiving an indication of stability, preferably, the user can proceed to capture an image of his/her ear (i.e., at the image capturing step 102). Alternatively, an image of the user's ear can be captured automatically upon receipt of an indication of stability (e.g., operatively alike Quick Response Code scanning or Barcode scanner). Therefore, an image of the user's ear (preferably with the Active Shape Model 200 overlaying the image of the user's ear as shown in FIG. 2b) can be captured. Based on the captured image of the user's ear, image based geometrical properties and/or features of the user's ear can be extracted/determined (e.g., in terms of pixels) at the analyzing step 106. Moreover, based on the scaling factor, which can be determined during the reference determination step 104, auto-scaling of the captured image of the user's ear can be performed so as to determine physical geometries and/or features of the user's ear (e.g., geometrical properties and/or features in terms of pixels can be converted/translated to physical dimensions in terms of centimeters).

Based on the determined physical geometries and/or features of the user's ear (which can, for example, be performed by the processor at, for example, the analyzing step 106), a search, which can be performed at the personalizing step 108, can be conducted in a HRTF database (e.g., an online database having a collection/library of HRTFs) to find a HRTF which matches/most closely matches such physical geometries and/or features. In this manner, a personalized HRTF can be created/generated. Appreciably, if it is desired to find a HRTF for each ear of a user (e.g., both the user's left and right ears), the earlier discussed method 100 of FIG. 1 can be applied accordingly. It is contemplated that the HRTF found (e.g., based on the earlier discussed search conducted in a HRTF database) for each ear can either be the same or different.

Alternatively, personalized HRTF can be created/generated, at the personalizing step 108, by perturbing an existing HRTF (e.g., a HRTF available in a HRTF database). Perturbation of an existing HRTF can be by manner of interpolating one than one Head Related Impulse Response (HRIR). Specifically, based on the determined physical geometries and/or features of the user's ear, a search can be conducted in a database (e.g., an online database having a collection/library of HRIRs) to find more than one HRIR (i.e., HRIR-A and HRIR-B) which most closely match such physical geometries and/or features. A process of cross-fading of the found HRIRs can be performed to generate an interpolated HRIR (i.e., "HRIR-Interpolated"). A further process of Fourier transformation can be performed to derive the HRTF. Appreciably, personalized HRTF can be created/generated based the interpolated HRIR. In relation to cross-fading, fading coefficient for each found HRIR can be inversely proportional to distance (e.g., Euclidean or Mahalanobis distance). For example:

HRIR-A=[a1, a2, a3, . . . a25];
HRIR-B=[b1, b2, b3, . . . b25];
HRIR-Interpolated=[a1*c+b1*(1−c), . . . ], where "c" represents the aforementioned distance and ranges from 0 to 1.

In another alternative, based on the determined physical geometries and/or features of the user's ear, a three-Dimensional (3D) model of the user's ear can be constructed. With 3D geometry based on the constructed 3D model, wave propagation simulation methods (e.g., "Efficient and Accurate Sound Propagation Using Adaptive Rectangular Decomposition" by Raghuvanshi N., Narain R., and Lin M. C.—IEEE Transactions on Visualization and Computer Graphics 2009) can be used to create/generate a personalized HRTF.

Therefore, given that it is possible to obtain a personalized/customized HRTF simply by manner of a user capturing an image of his/her ear using, for example, a Smartphone. It is appreciable that the present disclosure facilitates creating/generating personalized HRTF(s) in a user friendly and/or efficient manner. Moreover, a personalized/customized HRTF can also be created/generated in real-time.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

For example, other than interpolating HRIR, the present disclosure contemplates that it is possible to also interpolate ear models to match user ear features/geometries using 3D morphing methods (e.g. "Cross-Parameterization and Compatible Remeshing of 3D Models" by Kraevoy V., Sheffer A., ACM Transactions on Graphics (TOG)—Proceedings of ACM SIGGRAPH 2004) and performing acoustic simulation to derive a new HRIR. The new HRIR can be Fourier transformed to derive the HRTF).

In another example, the present disclosure contemplates the possibility of capturing the dimension of the user's head to further improve on the HRTF quality. Specifically, the present disclosure contemplates that the dimension of the head (head width and depth) may be important for HRTF computation, Capturing the head dimension can be possible since, in accordance with an embodiment of the disclosure, both the frontal and side images (i.e., in relation to the earlier discussed "selfie(s)"). Alternatively, a head detector (even one based on ASM but with head-model instead) can be used for capturing head dimension.

The invention claimed is:

1. A method for enhancing audio rendering by generating a customized HRTF comprising:
    acquiring a captured image of at least one ear of an individual using an image capturing device configured for processing a preliminary image that is a preliminary version of the captured image, the acquiring the captured image including applying a shape model to the preliminary image and the captured image of at least one ear of the individual to obtain a shape model conformed to the preliminary image and the captured image of at least one ear of the individual, the shape model being conformable to an object by being deformed based on control points;
    extracting image based properties of the at least one ear of the individual from the control points of the shape model conformed to the captured image of at least one ear of the individual; and
    providing the image based properties of the at least one ear of the individual to a selection processor configured to select based on image based properties of an ear a customized HRTF dataset from a plurality of HRTF datasets that have been determined for a plurality of individuals,
    wherein acquiring the captured image further includes generating a template of control points that is a visual guide overlaid in real-time onto a display screen of the image capturing device, wherein a device processor is configured to generate an indication of alignment to the user when the shape model conformed to the captured image of at least one ear of the individual are within an acceptable tolerance.

2. The method as recited in claim 1, further comprising:
    scaling image based properties of an ear corresponding to the captured image of the at least one ear of the individual and wherein the image capturing device is configured for displaying at least the preliminary version of the captured image on a display screen.

3. The method as recited in claim 2, wherein the scaling is performed using from the captured image at least one of a conventionally sized reference object; focal distance data and focal length associated with the focusing of the input image; or a tragus length for the ear in the input image.

4. The method as recited in claim 1, wherein acquiring a captured image includes a detecting step which combines both a determination of the presence of an ear and deformation of the shape model.

5. The method as recited in claim 1, wherein the shape model is an Active Shape Model and the Active Shape Model was previously trained on at least a plurality of ear images of individuals.

6. The method as recited in claim 1, wherein the preliminary image is one of several preliminary images iteratively processed by deforming the shape model to match the preliminary image of the ear.

7. The method as recited in claim 1, wherein the customized HRTF dataset from the plurality of HRTF datasets is selected based on matching most closely the extracted image based properties to the corresponding image based properties associated with each of the HRTF datasets in the plurality.

8. The method as recited in claim 1, wherein multiple HRTF datasets are selected from the plurality of HRTF datasets by matching one or more of image based properties and the customized HRTF is generated by one of interpolation or perturbation relating to at least one of the multiple HRTF datasets, and wherein the image based properties comprise one or more of distances of control points, arcs of control points, angles of control oints, geometric relationships of control points, a concha length, ear width, ear height, general physical dimensions of the ear, and a three dimensional representation of the ear.

9. A processing device for processing customized HRTFs, comprising:
    an image processing device configured for:
        acquiring a captured image of at least one ear of an individual and processing at least one preliminary image that is a preliminary version of the captured image;
        applying a shape model to the preliminary image and the captured image of at least one ear of the individual to obtain a shape model conformed to the preliminary image and the captured image of at least one ear of the individual, the shape model being conformable to an object by being deformed based on control points;
        extracting image based properties of the at least one ear of the individual from the control points of the shape model conformed to the captured image of at least one ear of the individual; and
        providing the extracted image based properties of the at least one ear of the individual to a selection processor configured to select based on image based properties of an ear a customized HRTF dataset from a plurality of HRTF datasets that have been determined for a plurality of individuals,
    wherein the image processing device comprises a display screen for displaying the preliminary image to the user and wherein acquiring the captured image further includes generating a template of control points that is a visual guide overlaid in real-time onto the display screen of the image processing device to assist in alignment, wherein a device processor is configured to generate an indication of alignment to the user when the shape model conformed to the captured image of at least one ear of the individual are within an acceptable tolerance.

10. The processing device as recited in claim 9, wherein the image processing device is further configured for scaling image based properties of an ear corresponding to the captured image of the at least one ear of the individual.

11. The processing device as recited in claim 10, wherein the scaling is performed using from the captured image at least one of a conventionally sized reference object; a focal distance data associated with the focusing of the captured image; or a tragus length for the ear in the captured image.

12. The processing device as recited in claim 10, wherein the customized HRTF dataset from the plurality of HRTF datasets is selected based on matching most closely the extracted image based properties to the image based properties associated with each of the HRTF datasets in the plurality of HRTF datasets.

13. The processing device as recited in claim 10, wherein the shape model is an Active Shape Model and the Active Shape Model was previously trained on at least a plurality of images of individuals.

14. The processing device as recited in claim 10, wherein multiple HRTF datasets are selected from the plurality of HRTF datasets by matching one or more of image based properties and the customized HRTF is generated by one of interpolation or perturbation relating to at least one of the multiple HRTF datasets, and wherein the image based properties comprise one or more of distances of control points, arcs of control points, angles of control points, geometric relationships of control points, a concha length, ear width, ear height, general physical dimensions of the ear, and a three dimensional representation of the ear.

15. A system for generating customized HRTFs comprising:
   an image processing device configured for acquiring a captured image of at least one ear of an individual and for processing a preliminary image that is a preliminary version of the captured image;
   a device processor configured for:
      applying a shape model to the preliminary image and the captured image of at least one ear of the individual to obtain a shape model conformed to the preliminary image and the captured image of at least one ear of the individual, the shape model being conformable to an object by being deformed based on control points; and extracting image based properties of the at least one ear of the individual from the control points of the shape model conformed to the captured image of at least one ear of the individual;
   a selection processor for receiving the extracted image based properties of the at least one ear of the individual and configured to select based on image based properties of an ear a customized HRTF dataset from a plurality of HRTF datasets that have been determined for a plurality of individuals wherein the device processor and the selection processor can be separate units or combined into one processor; and
   a memory accessible by the selection processor and including the plurality of HRTF datasets, wherein the plurality of HRTF datasets is indexed by image based properties corresponding to an ear represented by each HRTF dataset in the plurality of HRTF datasets,
   wherein acquiring the captured image of the at least one ear of the individual further includes generating a template of control points that is a visual guide overlaid in real-time onto a display screen of the image processing device to assist in alignment, wherein the device processor is configured to generate an indication of alignment to the user when the shape model conformed to the captured image of at least one ear of the individual are within an acceptable tolerance.

16. The system as recited in claim 15, wherein the customized HRTF dataset from the plurality of HRTF datasets is selected based on matching most closely the extracted image based properties to the corresponding image based properties associated with each of the HRTF datasets in the plurality of HRTF datasets.

17. The system as recited in claim 15, wherein multiple HRTF datasets are selected from the plurality of HRTF datasets by matching one or more of image based properties; and the customized HRTF is generated by one of interpolation or perturbation relating to at least one of the multiple HRTF datasets; and wherein the image based properties comprise one or more of distances of control points, arcs of control points, angles of control points, geometric relationships of control points, a concha length, ear width, ear height, general physical dimensions of the ear, and a three dimensional representation of the ear.

* * * * *